US007565382B1

(12) United States Patent
Sobel

(10) Patent No.: US 7,565,382 B1
(45) Date of Patent: Jul. 21, 2009

(54) SAFELY ROLLING BACK A COMPUTER IMAGE

(75) Inventor: William E. Sobel, Stevenson Ranch, CA (US)

(73) Assignee: Symantec Corporation, Cupertino, CA (US)

( * ) Notice: Subject to any disclaimer, the term of this patent is extended or adjusted under 35 U.S.C. 154(b) by 181 days.

(21) Appl. No.: 10/642,355

(22) Filed: Aug. 14, 2003

(51) Int. Cl.
*G06F 12/00* (2006.01)
*G06F 17/30* (2006.01)

(52) U.S. Cl. ........................... 707/202; 707/204

(58) Field of Classification Search .................. 707/8, 707/10, 101, 202, 103 R, 104.1, 200, 204; 711/162, 103; 726/29, 34; 714/3, 15
See application file for complete search history.

(56) References Cited

U.S. PATENT DOCUMENTS

| | | | | |
|---|---|---|---|---|
| 5,745,669 A * | 4/1998 | Hugard et al. | .................. | 714/3 |
| 6,016,553 A | 1/2000 | Schneider et al. | ............. | 714/21 |
| 6,199,178 B1 | 3/2001 | Schneider et al. | ............. | 714/21 |
| 6,240,527 B1 | 5/2001 | Schneider et al. | ............. | 714/21 |
| 6,298,443 B1 * | 10/2001 | Colligan et al. | ............... | 726/29 |
| 6,336,161 B1 * | 1/2002 | Watts | ........................ | 711/103 |
| 6,594,744 B1 * | 7/2003 | Humlicek et al. | ........... | 711/162 |
| 6,611,850 B1 * | 8/2003 | Shen | .......................... | 707/204 |
| 6,711,686 B1 * | 3/2004 | Barrett | ....................... | 709/221 |
| 6,772,155 B1 * | 8/2004 | Stegelmann | .................... | 707/8 |
| 6,931,552 B2 * | 8/2005 | Pritchard et al. | .............. | 726/34 |
| 2003/0115483 A1 * | 6/2003 | Liang | ......................... | 713/201 |
| 2003/0208447 A1 * | 11/2003 | Stefik et al. | .................... | 705/51 |
| 2004/0117622 A1 * | 6/2004 | Marquet et al. | ............. | 713/165 |
| 2006/0107006 A1 * | 5/2006 | Green et al. | ................. | 711/162 |

OTHER PUBLICATIONS

"Use System Restore to Undo Changes if Problems Occur" Windows XP, Aug. 24, 2001: http:www.microsoft.com/windowsxp/using/helpandsupport/learnmor . . . .
"The Hollywood Standard in DVD." Sonic Solutions, Oct. 14, 2002: http://www.sonic.com/about/press/news/2002/october/roxio-goback3 . . . .
Computer Buyer: Product Reviews: Roxio GoBack 3 Deluxe, Dec. 2001: http://www/pcpro.co.uk/buyer/reviews/5002/roxio-goback-3-deluxe.htm.

* cited by examiner

*Primary Examiner*—Don Wong
*Assistant Examiner*—Merilyn P Nguyen
(74) *Attorney, Agent, or Firm*—Van Pelt, Yi & James LLP

(57) ABSTRACT

Techniques are disclosed for safely rolling back a computer image. A system and method for rolling back an image are provided wherein a roll-back state is determined and a current state is configured to the roll-back state, and for determining whether the roll-back state is secure. A system and method are also provided for scanning a repository, leaving a marker in a first portion of the repository, determining a safe state, reverting the computer state to the safe state, and analyzing a second portion of the repository determined by the marker and the safe state.

25 Claims, 8 Drawing Sheets

SAFELY ROLLING BACK A COMPUTER IMAGE

FIELD OF THE INVENTION

The present invention relates generally to software. More specifically, techniques for safely rolling back a computer image are disclosed.

BACKGROUND OF THE INVENTION

For individual users and organizations alike, computers and computing technology are important and useful tools. Modern operating systems (OS) and utilities provide capabilities for a user to "roll back" or restore a system configuration to a previous state. This action is performed in the context of system attack, degradation, or damage resulting from a vulnerability exploitation, attack, virus, or conflicts which may occur as new software and drivers are installed on to a system.

A computer fundamentally relies upon its operating system, if any, and other installed software which can affect the computing state. Viruses, attacks, and other software programs or applications ("applications") can detrimentally affect a computer's state and cause, often irreversible, errors and damage leading to an "infected state."

Some examples of errors and damage that may occur include the elimination or over-writing of data on a hard drive, disk, storage array, etc. This information may include critical, valuable, or sensitive information. Other risks that may occur include vulnerability to third parties attempting to gain access to information on a particular hard drive, susceptibility to virus-borne attacks, non-operation of a computer after an attack has crippled the operating system, related files, or other important aspects of the computer.

System restoration and file restoration can be used to address problems resulting from failed or damaged computer states. Addressing vulnerability attacks, viruses, etc. often retroactively seek to restore the computer's state back to a safe point or safe state prior to the harmful event. System restoration techniques may restore the operating system, but may fail to restore any applications, data, or information that may have been written to the computer's memory between the last safe point and the harmful event. However, if a previous system configuration was previously infected with a computer virus, but since repaired, the roll back operation may revert the system to an infected state. A file restoration may also only restore particular files and not the entire state. Generally, restoring system or files/applications back to a safe point may only restore the previous state and not provide for security measures to ensure that the harmful, insecure events do not occur again.

Thus, there is a need for a solution to safely roll back a computer system image. More importantly, there is a need for a solution to safely roll back a computer system image to a secure state, providing security measures and updates to prevent vulnerability to future attacks, unwanted intrusions, viruses, etc. There is also a need to determine if the user can safely restore information from an earlier state, without invoking an infected state.

SUMMARY OF THE INVENTION

A method for rolling a computer resource back to a state associated with a computer image is disclosed. In some embodiments, a roll-back state associated with the computer image is determined. The current state is configured to the roll-back state and it is determined whether the roll-back state is secure.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
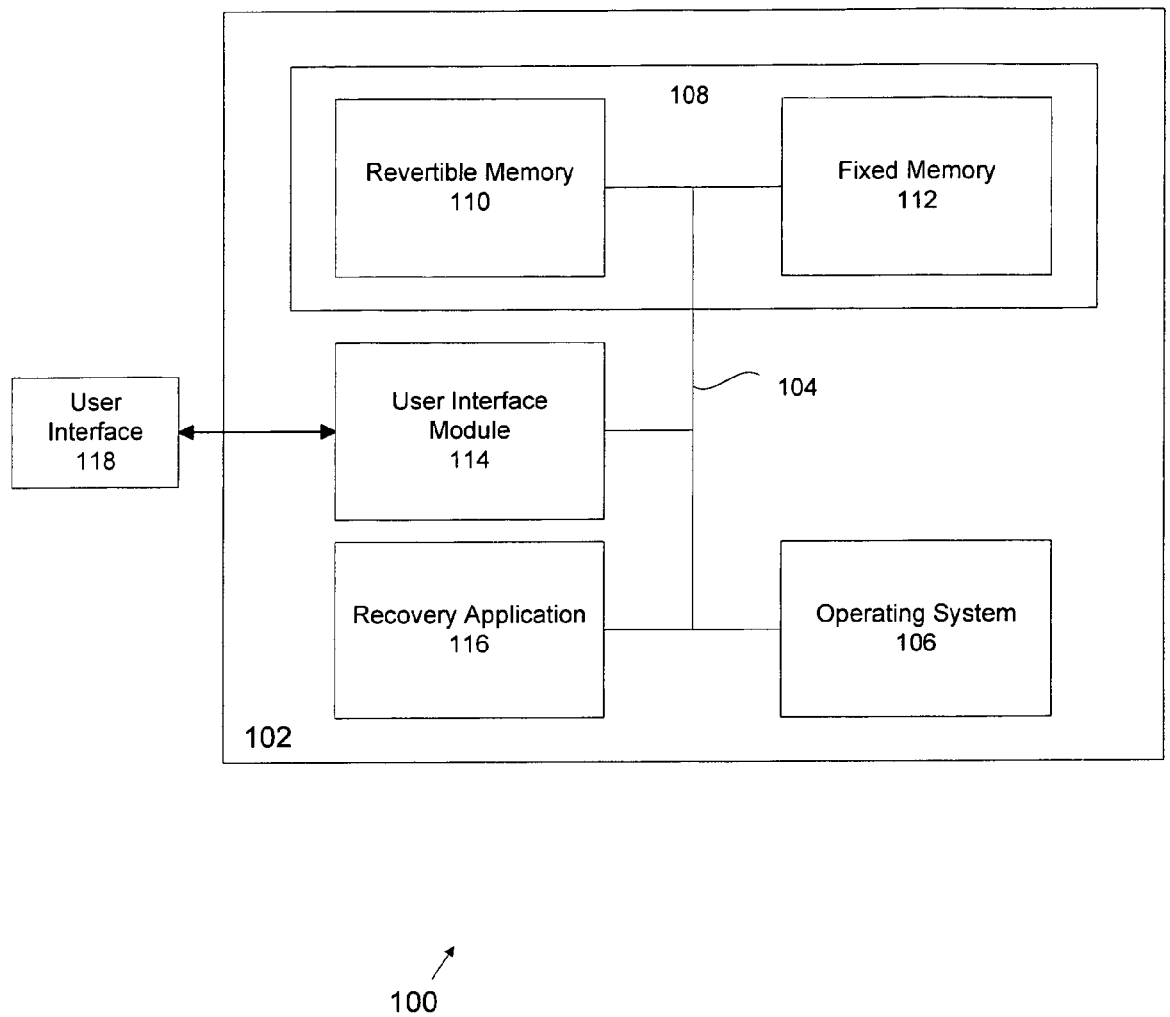
FIG. 1 illustrates a conventional state restoration system.

FIG. 1 illustrates a conventional state restoration system 100. Typically, conventional state restoration system 100 can be implemented on a computer 102. Using a bus 104, data may be exchanged between the various components shown. An operating system 106 provides a state for the computer 102. Housed within computer 102 and communicating along bus 104 are repository 108 (having a revertible memory 110 and a fixed memory 112), a user interface module 114 for receiving user input and providing display abilities, and a recovery application 116. Typically, recovery application 116 can be used to restore an infected or damaged file or system. However, conventional solutions do not address the problems discussed above with regard to securing the rolled-back state. Solutions in accordance with embodiments of the present invention will be discussed below.

According to the embodiments disclosed herein, techniques for safely rolling back a computer image, including file, application, and system images, are discussed. In order to overcome the conventional limitations and problems discussed above, a system and method for safely rolling back a computer image are disclosed. Some embodiments can scan files and system configuration details prior to executing a restoration operation. Where a potential rolled-back state may be insecure or infected, various options may be invoked to handle the vulnerabilities or risks.

Figure 2:
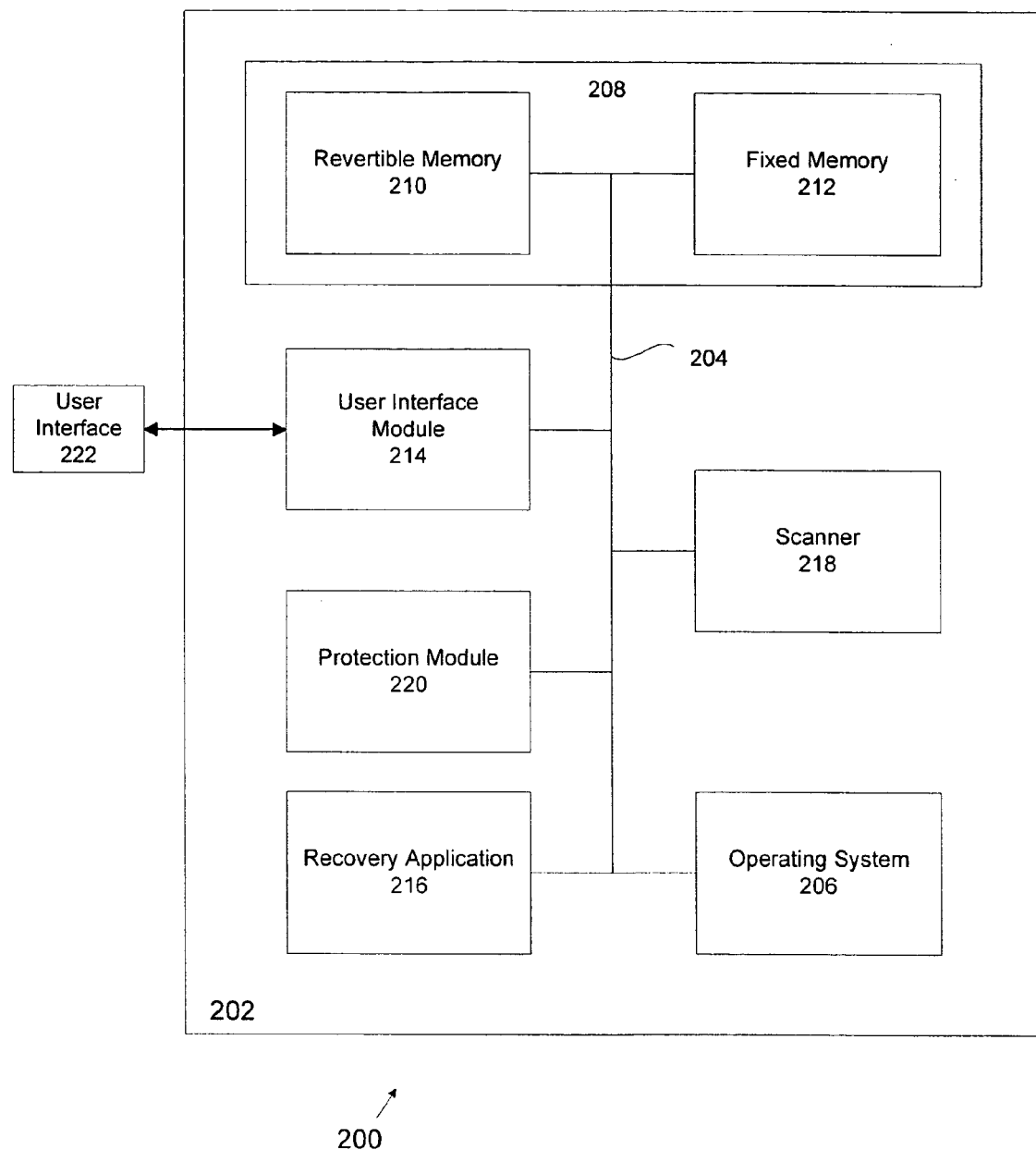
FIG. 2 is an exemplary embodiment of a system for safely rolling back a computer image.

FIG. 2 is an exemplary embodiment of a system for safely rolling back a computer image 200. The system 200 can be implemented on a computer 202. Computer 202 can be a personal computer, client, server, DTE, terminal, networked computer, mainframe, minicomputer, or other computing device. Using a bus 204, operating system 206 can exchange data, information, and instructions with other components of the system 200 including repository 208. Housed within repository 208 are a revertible memory 210 and a fixed memory 212. However, revertible memory 210 and fixed memory 212 may also be found external to repository 208 in other embodiments.

Also shown in the embodiment of FIG. 2 are a user interface module 214 and a recovery application 216. The user interface module 214 provides capabilities and functionality to allow users to exchange data with system 200, display information, configure system 200, and other system functions. A scanner 218 and protection module 220 are also included in the embodiment shown. Scanner 218 scans and determines the state of the computer to be rolled back and exchanges data with protection module 220. Protection module 220, using data from scanner 218, rolls back the computer state as well as provides for security and non-infection as well. Details of the processes involved with protection module 220 will be described below in connection with FIGS. 3-6.

In order to prevent the detrimental effects of an infected or "bad" state, the protection module 220 interfaces with restore functionality found in recovery application 216. The protection module 220 provides for actions including the determination of whether a restore location or "safe state" is acceptable and then updating the system 200 upon the occurrence of a restoration.

In another embodiment, protection module 220 scans targeted files, applications, or systems before restoring them. Protection module 220 determines whether the safe state (a.k.a "roll-back state) will be secure (non-infected) or insecure (infected). In other words, the current state is configured to the roll-back state. Protection module 220 directs scanner 218 to scan the targeted files, applications, or systems to determine if the roll back state is secure (i.e., the targeted files, applications, or systems would be infected if system 200 is rolled back to the safe state or roll-back state). If the scan shows that a risk such as an infection exists or if protection measures such as anti-virus software would be uninstalled if the state were rolled back to the safe state, then various policies, rules, and user input may apply. For example, if protection module 220 determines that a rolled-back state may not include anti-virus software that was installed at a time occurring after the roll-back state, then a warning may be displayed to the user or the roll-back may be stopped. Other options may be configured by a user, system/network administrator, or other person to invoke particular actions upon the discovery of a risk to the safe state. Policies, rules, and configurations may differ among various users depending upon the computing environment (i.e., home, enterprise, etc.). However, protection module 220 is not intended to be limited to only those environments discussed above. Further, pre-scans may be conducted at available restore-points, caching the results of the pre-scans, increasing both speed and efficiency in effecting roll-backs. The process of this embodiment is further illustrated below in connection with FIGS. 3-6.

Figure 3:
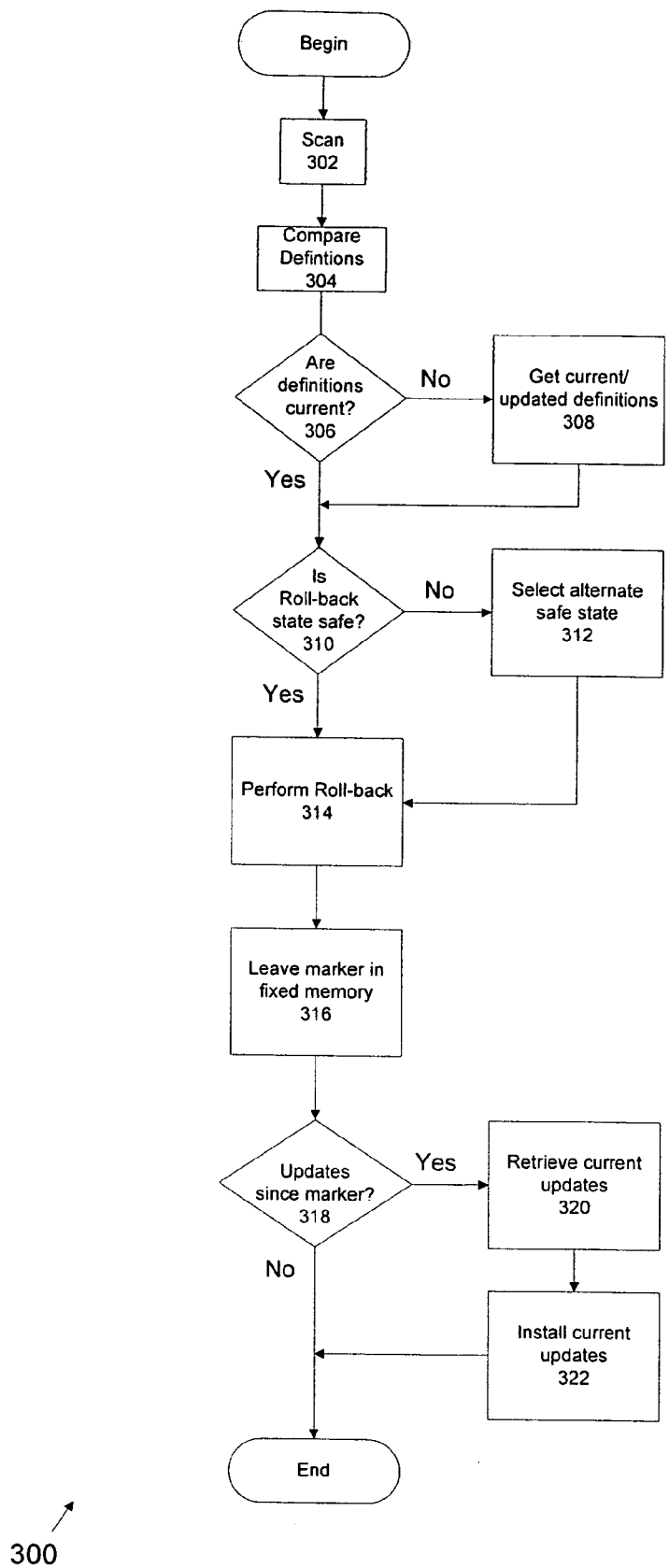
FIG. 3 illustrates an exemplary embodiment of a method for safely rolling back a computer image.

FIG. 3 illustrates an exemplary embodiment of a method for safely rolling back a computer image. A roll-back operation may be executed at any point and is not limited to those examples presented herein. The roll-back operation may be executed during the boot-up phase, restart, or initial start-up phase of an operating system. Rolling back to a safe state is not limited to a particular point during the system operation.

As discussed above, protection module 220 directs scanner 218 to scan system 200 to determine if the roll-back state or safe state is secure (302). Definitions of available security measures are then compared (304) to determine if these are current definitions in the roll-back state. It is then determined if the definitions are current (306). If the definitions will not be current after the roll-back is performed, then the protection module 220 retrieves current/updated security definitions (308). Protection module 220 again decides whether the roll-back state will be safe (310).

In determining whether the roll-back state is safe, the protection module 220 also considers whether any installed security or vulnerability assessment software may become uninstalled if the roll-back is performed. If so, then an alternate state is selected in (312). If not, then the roll-back is performed (314). During the roll-back operation, a marker is left in fixed memory 212 (FIG. 2) to mark the point at which the system was rolled back ("restore point" or "roll-back point") (316).

Again, protection module 220 determines whether any security software, vulnerability assessment, anti-virus, or other related software updates have occurred (318). If so, then the current updates are retrieved and installed (320-322), thus completing the roll-back operation.

Figure 4:
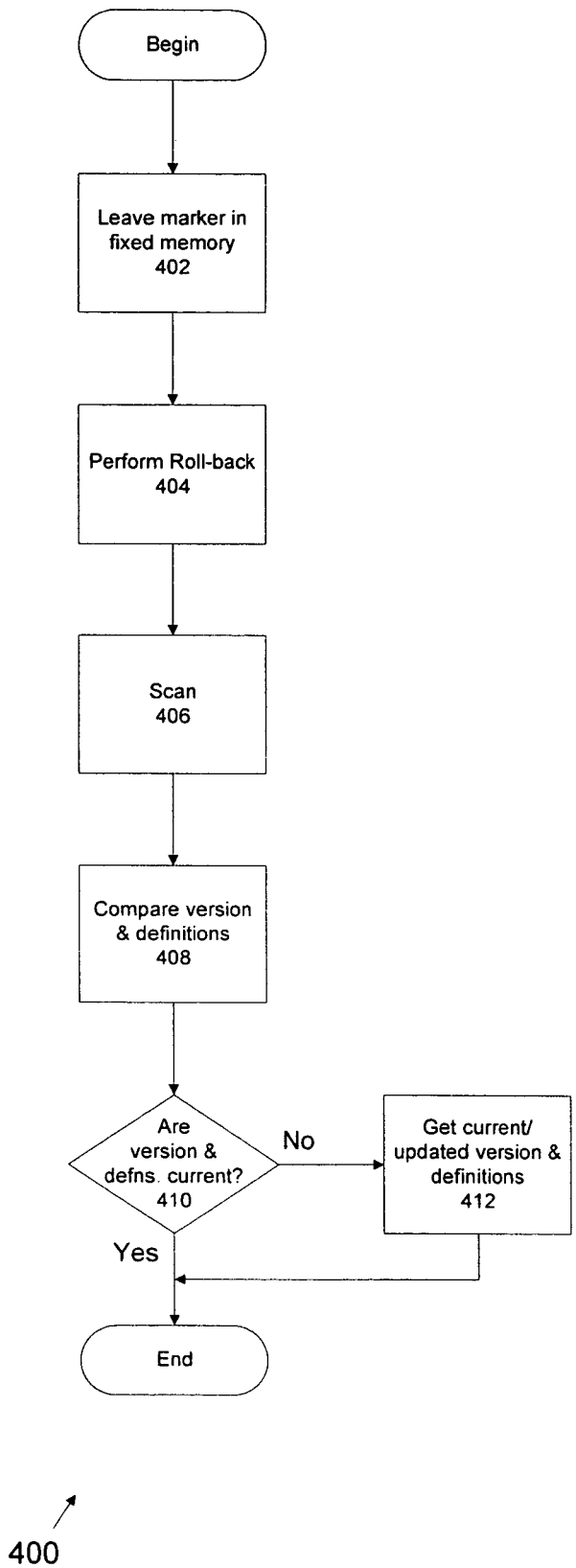
FIG. 4 illustrates a further exemplary embodiment of a method for safely rolling back a computer image.

In an alternative embodiment, when the system is restored to a safe state which does not have the same protection measures or security software as before the roll-back, the functionality of protection measures (e.g., updated anti-virus software) should be implemented immediately after the roll-back occurs. Fixed memory 212 (FIG. 2) is used to track the version status of various protection products and definitions. For example, if a fixed, non-revertible memory 212 can retain less than 1 k bytes per application, as in the case of the current Go Back application from Roxio, Inc., then the version of the product and the security definitions used can be stored. Storage in fixed memory 212 will prevent erasure when a roll-back is performed. Thus, upon restart after completion of a roll-back, protection module 220 and individual protection applications can determine whether the latest version and definitions are present in the safe state using the information in fixed memory 212. If not and the versions present in the safe state are older than those present prior to the roll-back, then a restoration is recorded and a product update can be forced to occur. Also, protection module 220 can retrieve and install the latest version and definitions, subject to user input, policies, and rules communicated via user module 214. FIG. 4 illustrates an embodiment of the above-process.

FIG. 4 illustrates a further exemplary embodiment of a method for safely rolling back a computer image. Regardless of whether the image is a file, application, or operating system, in accordance with one embodiment, a safe state can be achieved in the following manner. A marker is left in the fixed memory space (402). A rollback operation is then performed (404). Generally, a reboot is required at the end of the rollback operation, thus requiring the marker to be left prior to the roll-back operation. A roll-back is performed to a safe state. A marker, cue, or other indicator can be left in fixed memory 212 (FIG. 2) to indicate the restore point, roll-back point, or point to which the system, file, or application was rolled back. A scan is performed (406). Next, the version and definitions for protection and security applications are compared (408). Protection module 220 then determines whether the version and definitions are current (410). If the version and definitions of installed security software, protection measures, anti-virus software, vulnerability assessment applications, etc. are current, then the roll-back is complete. If not, then current updates, versions, and definitions are retrieved and installed (412).

Figure 5:
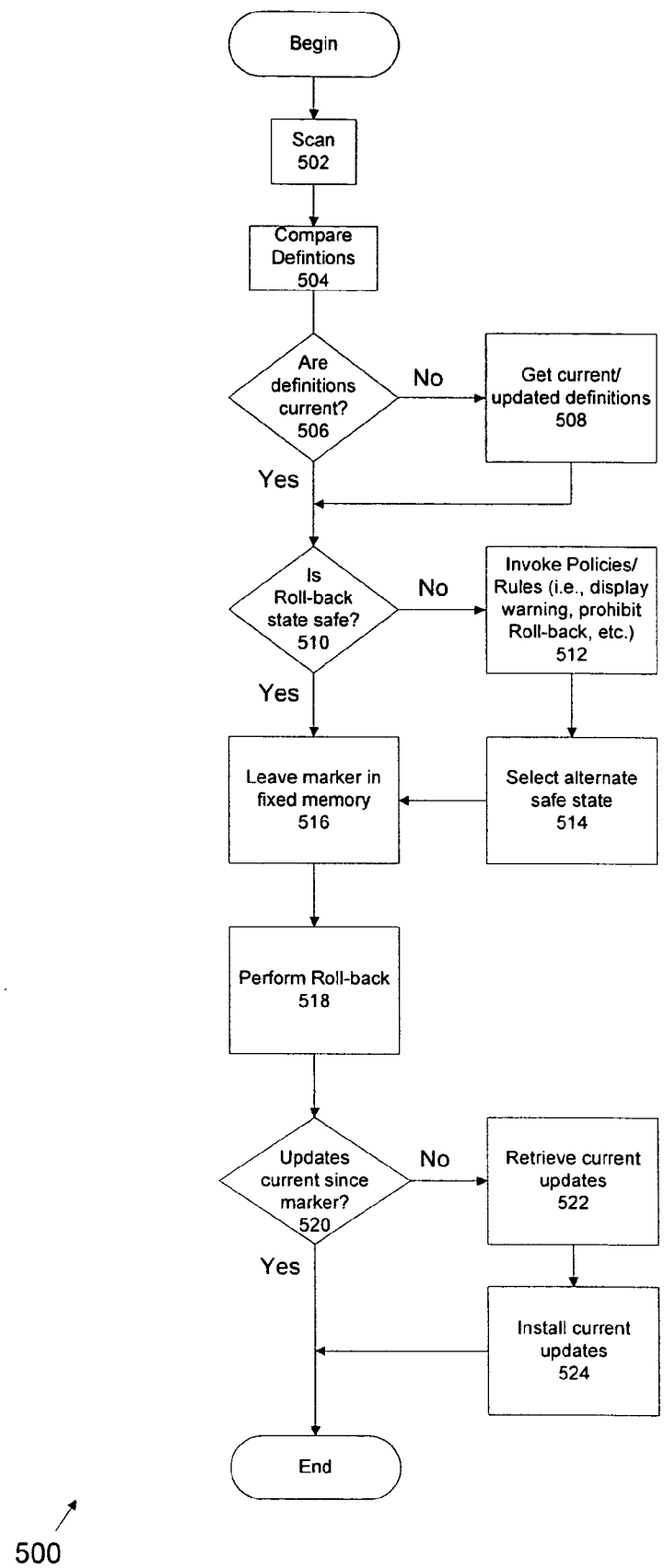
FIG. 5 is an alternative embodiment of a method for safely rolling back a computer image.

FIG. 5 is an alternative embodiment of a method for safely rolling back a computer image. Again, scanner 218 scans the files, applications, or systems intended for roll-back (502). After ensuring that protection measures such as anti-virus software programs are current and updated (504-508), protection module 220 determines whether a roll-back state is a safe state (510). In other words, protection module 220 determines whether the roll-back state is secure and can be rolled-back to without creating a vulnerable state. If the roll-back state is not secure or not safe, then policies, rules, or user-specified configurations may be invoked (512). This may include actions such as displaying a warning, preventing the roll-back, etc. The unsafe roll-back point may also force the selection of an alternate safe state (514). If the roll-back state is safe, then a marker is left in fixed memory 212 (516).

Again, a roll-back operation is performed (518) and updates are evaluated to determine whether they are current (520), focusing on the period between the marker and the roll-back state. If not updated, then protection module 220 can retrieve and install any required updates or definitions (522-524), subject to any user policies or configurations, as shown in FIG. 6.

Figure 6:
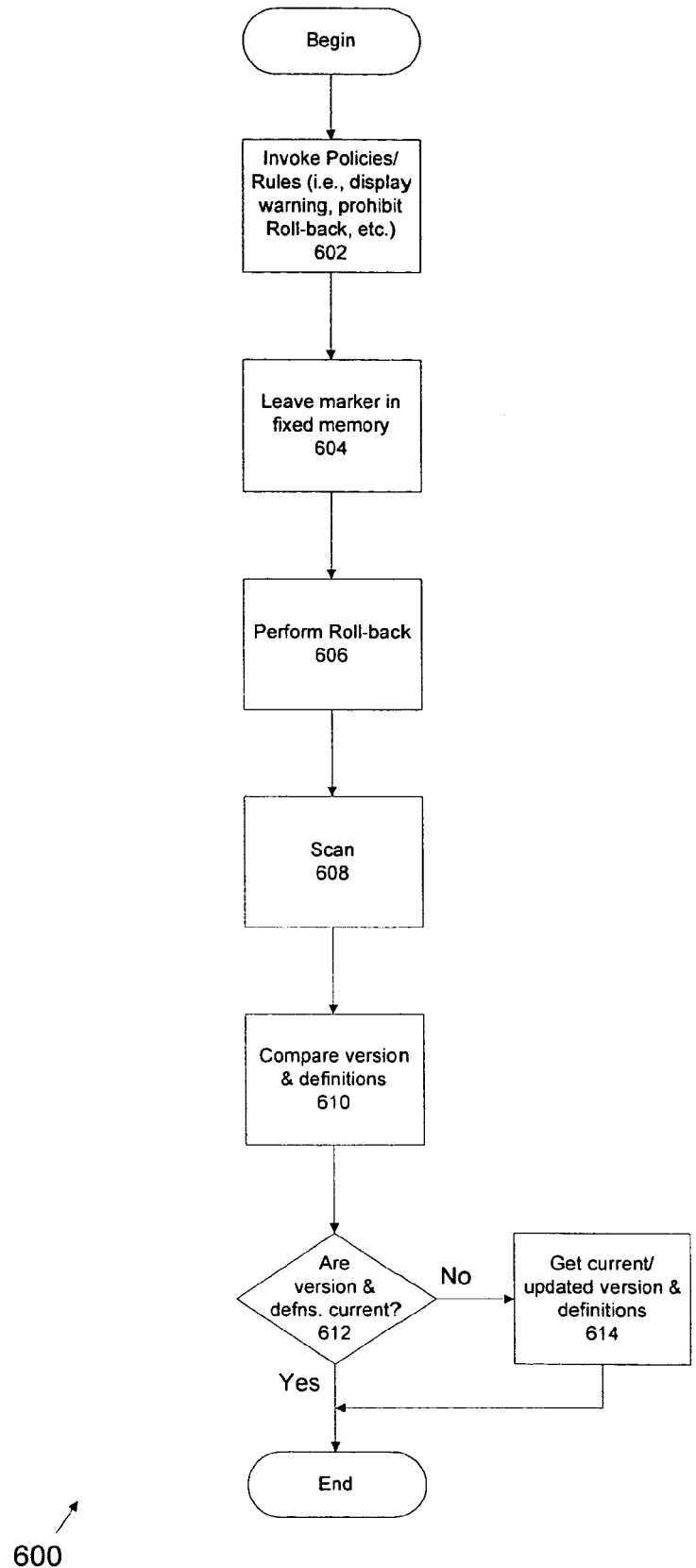
FIG. 6 illustrates another alternative embodiment of a method for safely rolling back a computer state.

FIG. 6 illustrates another alternative embodiment of a method for safely rolling back a computer state. Although similar to the process of FIG. 5, the method shown illustrates the use of polices and rules which can be invoked during the roll-back operation. If the roll-back state is unsafe, then user-specified configurations, policies, or rules may prevent the roll-back from completion. Policies and rules, which may be user-specified or automatically generated, may require the display of a warning, force the updating of protection measures, security software, anti-virus programs, definitions, and versions prior to the completion of the roll-back, or other actions in order to prevent the rolled-back state from becoming exposed to outside vulnerabilities.

Policies or rules specified by the user, automatically, semi-automatically, or otherwise are invoked (602). These policies may include warnings, display windows posting notice of potential vulnerabilities, or actions taken to prevent a roll-back operation from occurring. After policies and/or rules have been applied, a marker is left in fixed memory 212 (604) and a roll-back operation is performed (606). After performing a scan (608), security software versions and definitions are compared to determine whether updates or replacements are required (610). Protection module 220 determines if the versions and definitions are current (612) and, if so, completes the roll-back operation. If the versions and definitions of security software or other protective measures are not updated or current, then protection module 220 retrieves any necessary updates or current definitions (614).

Figure 7:
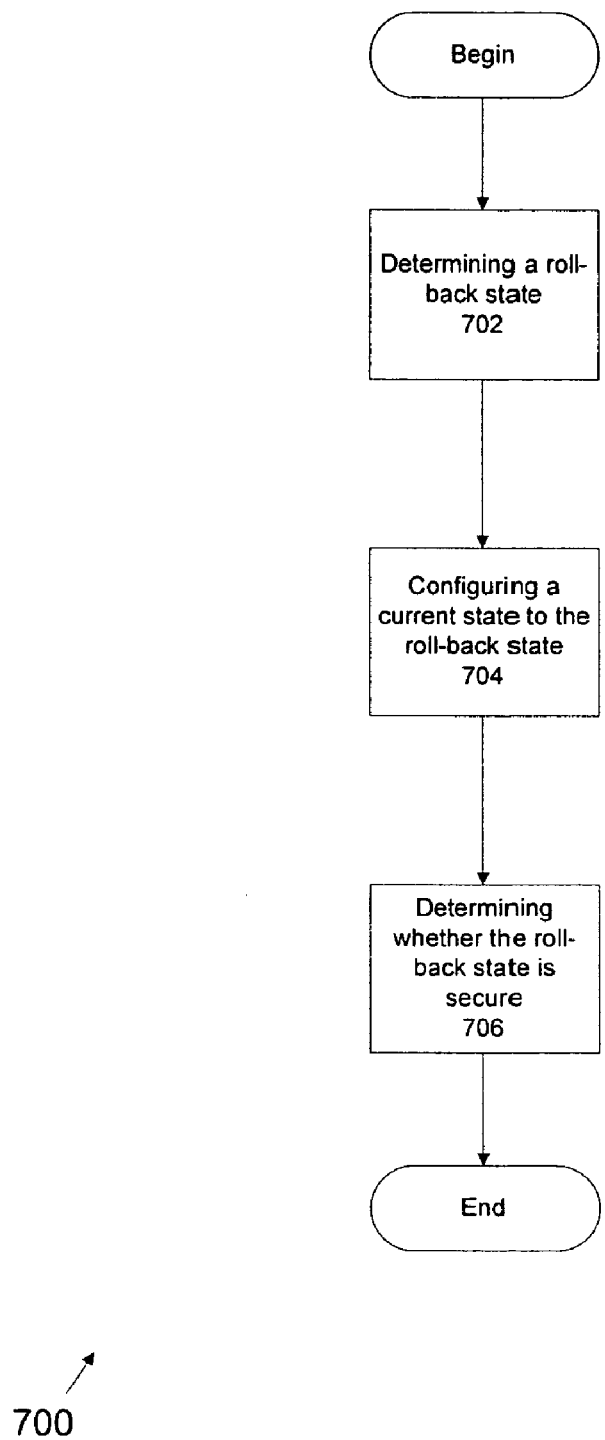
FIG. 7 is a flow chart illustrating an alternative embodiment of a method for safely rolling back a computer state.

FIG. 7 is a flow chart illustrating an alternative embodiment of a method for safely rolling back a computer state. A roll-back state is determined (702). Next, a current state is configured to the roll-back state (704). Once the current state has been configured to the roll-back state, a check is performed to determine whether the roll-back state is secure.

Figure 8:
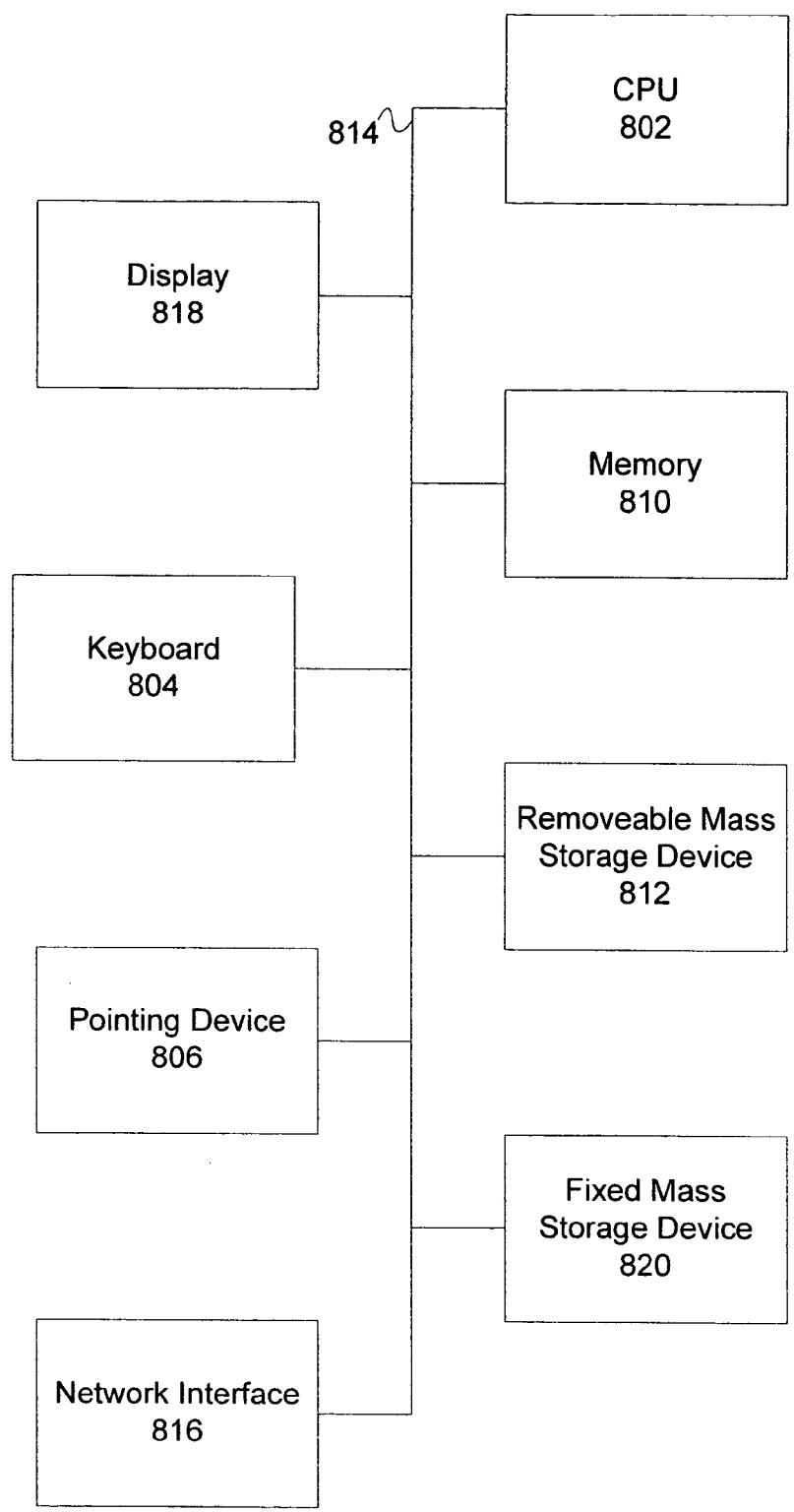
FIG. 8 is a block diagram of a general purpose computer system suitable for carrying out the processing in accordance with one embodiment of the present invention.

FIG. 8 is a block diagram of a general purpose computer system 800 suitable for carrying out the processing in accordance with one embodiment of the present invention. FIG. 8 illustrates one embodiment of a general purpose computer system. Other computer system architectures and configurations can be used for carrying out the processing of the present invention. Computer system 800, made up of various subsystems described below, includes at least one microprocessor subsystem (also referred to as a central processing unit, or CPU) 802. That is, CPU 802 can be implemented by a single-chip processor or by multiple processors. CPU 802 is a general purpose digital processor which controls the operation of the computer system 800. Using instructions retrieved from memory 810, the CPU 802 controls the reception and manipulation of input data, and the output and display of data on output devices.

CPU 802 is coupled bi-directionally with memory 810 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 802. Also as well known in the art, primary storage typically includes basic operating instructions, program code, data and objects used by the CPU 802 to perform its functions. Primary storage devices 810 may include any suitable computer-readable storage media, described below, depending on whether, for example, data access needs to be bi-directional or uni-directional. CPU 802 can also directly and very rapidly retrieve and store frequently needed data in a cache memory (not shown).

A removable mass storage device 812 provides additional data storage capacity for the computer system 800, and is coupled either bi-directionally or uni-directionally to CPU 802. For example, a specific removable mass storage device commonly known as a CD-ROM typically passes data uni-directionally to the CPU 802, whereas a floppy disk can pass data bi-directionally to the CPU 802. Storage 812 may also include computer-readable media such as magnetic tape, flash memory, PC-CARDS, portable mass storage devices, holographic storage devices, and other storage devices. A fixed mass storage 820 can also provide additional data storage capacity. The most common example of mass storage 820 is a hard disk drive. Mass storage 812, 820 generally store additional programming instructions, data, and the like that typically are not in active use by the CPU 802. It will be appreciated that the information retained within mass storage 812, 820 may be incorporated, if needed, in standard fashion as part of primary storage 810 (e.g. RAM) as virtual memory.

In addition to providing CPU 802 access to storage subsystems, bus 814 can be used to provide access other subsystems and devices as well. In the described embodiment, these can include a display monitor 818, a network interface 816, a keyboard 804, and a pointing device 806, as well as an auxiliary input/output device interface, a sound card, speakers, and other subsystems as needed. The pointing device 806 may be a mouse, stylus, track ball, or tablet, and is useful for interacting with a graphical user interface.

The network interface 816 allows CPU 802 to be coupled to another computer, computer network, or telecommunications network using a network connection as shown. Through the network interface 816, it is contemplated that the CPU 802 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 802 can be used to connect the computer system 800 to an external network and transfer data according to standard protocols. That is, method embodiments of the present invention may execute solely upon CPU 802, or may be performed across a network such as the Internet, intranet networks, or local area networks, in conjunction with a remote CPU that shares a portion of the processing. Additional mass storage devices (not shown) may also be connected to CPU 802 through network interface 816.

An auxiliary I/O device interface (not shown) can be used in conjunction with computer system 800. The auxiliary I/O device interface can include general and customized interfaces that allow the CPU 802 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contains program code for performing various computer-implemented operations. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code that may be executed using an interpreter.

The computer system shown in FIG. 8 is but an example of a computer system suitable for use with the invention. Other computer systems suitable for use with the invention may include additional or less subsystems. In addition, bus 814 is illustrative of any interconnection scheme serving to link the subsystems. Other computer architectures having different configurations of subsystems may also be utilized.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for rolling a computer resource back to a state associated with a computer image comprising:
   determining a roll-back state associated with the computer image;
   determining whether the roll-back state is secure;
   performing one or more remediation actions prior to or during a roll-back of the computer resource to the roll-back state if the roll-back state is not secure; and
   rolling back the computer resource if the roll-back state is secure;
   wherein determining whether the roll-back state is secure comprises scanning data comprising the computer image to determine whether the computer resource, if rolled back to the roll-back state, would be one or both of:
      vulnerable to a known external attack; and
      in a compromised state as a result of a prior external attack made at a time prior to the computer image being generated; and
   wherein performing one or more remediation actions includes retrieving updated security definitions.

2. A method as recited in claim 1 wherein the image is a system image.

3. A method as recited in claim 1 wherein the image is a file.

4. A method as recited in claim 1 wherein the image is an application image.

5. A method as recited in claim 1 wherein determining whether the roll-back-state is secure includes evaluating a security definition in a repository providing data to the roll-back state.

6. A method as recited in claim 5 wherein determining whether the roll-back-state is secure includes determining whether the definition is updated.

7. A method as recited in claim 6 wherein determining whether the roll-back-state is secure includes retrieving an updated definition if the definition is not updated.

8. A method as recited in claim 7 wherein determining whether the roll-back-state is secure includes installing the updated definition if the definition is not updated.

9. A method as recited in claim 1 wherein performing one or more remediation actions includes:
   displaying a message; and
   receiving a user input.

10. A method as recited in claim 1 wherein performing one or more remediation actions includes displaying a warning to a user.

11. A method as recited in claim 1 wherein performing one or more remediation actions includes stopping the roll-back during the roll-back of the computer resource.

12. A method as recited in claim 1 wherein the remediation actions may be configured by a user, system/network administrator, or other person.

13. A computer program product for rolling a computer resource back to a state associated with a computer image, the computer program product being embodied in a computer readable storage medium and comprising computer instructions for:
   determining a roll-back state associated with the computer image;
   determining whether the roll-back state is secure;
   performing one or more remediation actions prior to or during a roll-back of the computer resource to the roll-back state if the roll-back state is not secure; and
   rolling back the computer resource if the roll-back state is secure;
   wherein determining whether the roll-back state is secure comprises scanning data comprising the computer image to determine whether the computer resource, if rolled back to the roll-back state, would be one or both of:
      vulnerable to a known external attack; and in a compromised state as a result of a prior external attack made at a time prior to the computer image being generated; and wherein performing one or more remediation actions includes retrieving updated security definitions.

14. A system for rolling a computer resource back to a state associated with a computer image comprising:
a processor; and
a memory coupled with the processor, wherein the memory is configured to provide the processor with instructions which when executed cause the processor to:
determine a roll-back state associated with the computer image;
determine whether the roll-back state is secure;
perform one or more remediation actions prior to or during a roll-back of the computer resource to the roll-back state if the roll-back state is not secure; and
roll back the computer resource if the roll-back state is secure;
wherein determining whether the roll-back state is secure comprises scanning data comprising the computer image to determine whether the computer resource, if rolled back to the roll-back state, would be one or both of:
vulnerable to a known external attack; and
in a compromised state as a result of a prior external attack made at a time prior to the computer image being generated; and
wherein performing one or more remediation actions includes retrieving updated security definitions.

15. A system as recited in claim 14 wherein the image is a file.

16. A system as recited in claim 14 wherein the image is an application image.

17. A system as recited in claim 14 wherein determining whether the roll-back-state is secure includes evaluating a security definition in a repository providing data to the roll-back state.

18. A system as recited in claim 17 wherein determining whether the roll-back-state is secure includes determining whether the definition is updated.

19. A system as recited in claim 18 wherein determining whether the roll-back-state is secure includes retrieving an updated definition if the definition is not updated.

20. A system as recited in claim 19 wherein determining whether the roll-back-state is secure includes installing the updated definition if the definition is not updated.

21. A system as recited in claim 14 wherein performing one or more remediation actions includes:
displaying a message; and
receiving a user input.

22. A system as recited in claim 14 wherein performing one or more remediation actions includes displaying a warning to a user.

23. A system as recited in claim 14 wherein performing one or more remediation actions includes stopping the roll-back during the roll-back of the computer.

24. A system as recited in claim 14 wherein the remediation actions may be configured by a user, system/network administrator, or other person.

25. A system as recited in claim 14 wherein the image is a system image.

* * * * *